United States Patent [19]
Burek et al.

[11] Patent Number: 5,440,666
[45] Date of Patent: Aug. 8, 1995

[54] SPLICE CLOSURE AND GRIP BLOCK

[75] Inventors: Denis E. Burek, Cumming; Marc D. Jones, Lithonia; Wesley W. Jones, Lawrenceville; Phillip M. Thomas, Suwanne, all of Ga.

[73] Assignee: AT&T Corp., Murray Hill, N.J.

[21] Appl. No.: 263,645

[22] Filed: Jun. 22, 1994

[51] Int. Cl.6 .............................. G02B 6/36
[52] U.S. Cl. ................... 385/135; 385/134; 385/136
[58] Field of Search ............ 385/135, 134, 136; 248/56

[56] References Cited

U.S. PATENT DOCUMENTS

| | | | |
|---|---|---|---|
| 4,799,757 | 1/1989 | Goetter | 385/135 |
| 4,958,903 | 9/1990 | Cobb et al. | 385/135 |
| 5,189,725 | 2/1993 | Bensell, III et al. | 385/135 |
| 5,333,233 | 7/1994 | Mansfield et al. | 385/134 |

Primary Examiner—Rodney B. Bovernick
Assistant Examiner—Phan T. H. Palmer

[57] ABSTRACT

An optical fiber cable closure assembly includes a base member and a mating cover which, when assembled form a hollow splice closure with openings at each end. Mounted to the base member at at least one end thereof is a grip block assembly which grips the optical cable entering the adjacent open end, and which automatically adjusts to differing sizes of cables. The grip block assembly has an upper member and a lower member and includes first and second pivotally mounted arms on the lower member which are actuated by actuating pins on the upper member and which, as the upper member is tightened down on the lower member, pivot until they bear against and grip the cable. Included within the closure assembly are one or more optical fiber splitters which are used to separate and segregate individual fibers or groups of fibers to be spliced. One or more fiber splice trays are mounted on the base member and function to hold a plurality of splices of any of a large number of types in position after the fibers are spliced, and to store excess fiber without allowing the fibers to be bent to their critical bending radius.

12 Claims, 6 Drawing Sheets

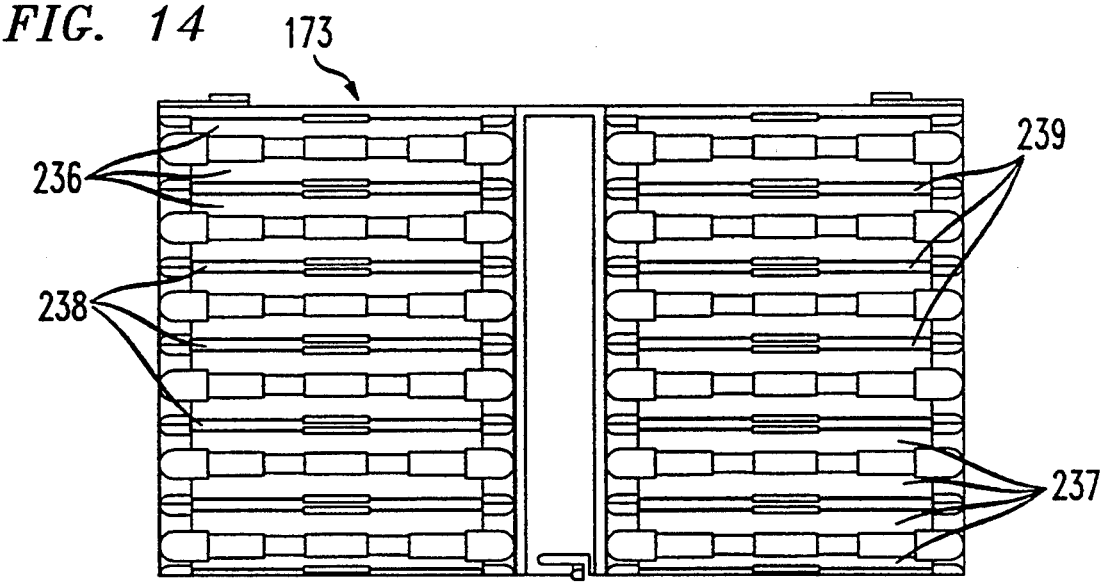
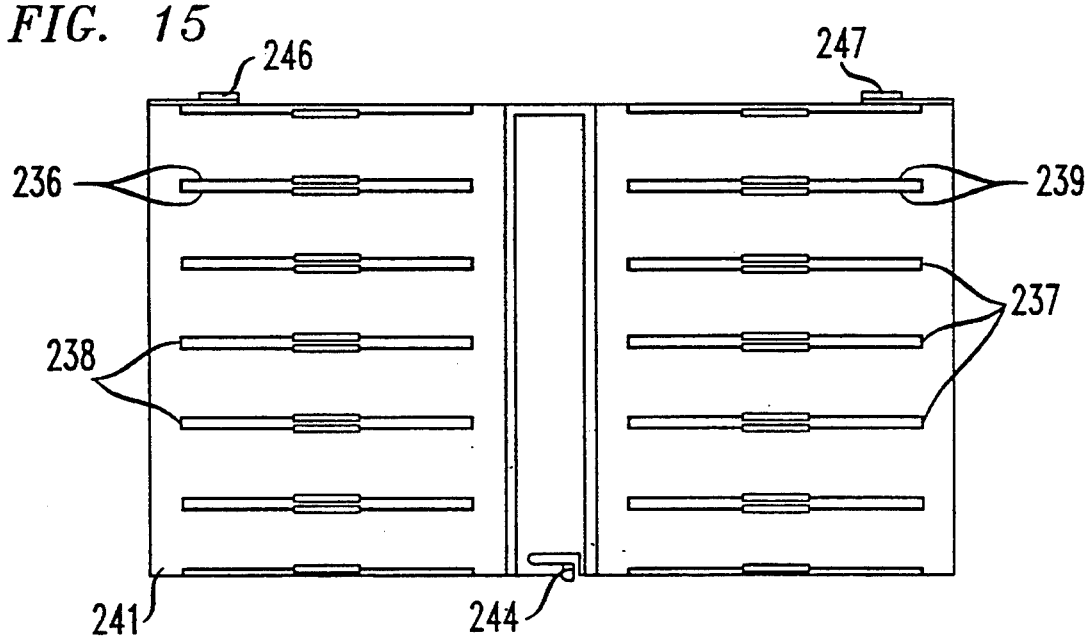

SPLICE CLOSURE AND GRIP BLOCK

FIELD OF INVENTION

This invention relates to an optical fiber cable closure and to the component parts thereof. More particularly, the invention relates to a closure capable of accepting and anchoring any of a large number of different fiber optic cables and of holding and protecting a large number of optical fiber splices regardless of the particular commercially available splices used.

BACKGROUND OF THE INVENTION

Present day communications technology is directed more and more to the use of optical fibers for transmission and hence the use of optical fiber cables containing a plurality of coated or sleeved optical fibers. The cables may take any of a number of forms such as a plurality of fibers contained within a tubular protective member, thereby forming a core or bundled together in protective loose tubes surrounding a central strength member. Alternatively, the fibers may be arrayed side by side on a ribbon member, with a plurality of such ribbons being stacked to form a high fiber count cable, and which are then enclosed in a protective plastic tube or jacket. Regardless of the type of cable used, splices are necessary for joining the ends of cables, and the fibers contained within them. It is necessary, therefore, to enclose the splices in a closure to contain and protect the splices of two or more fiber optic cables.

In metallic wire communications practices, a splice closure is used wherein the wire splices are stored and protected. Because of the innate strength of wire, it can be sharply bent to meet space limitations, and slack wire within the enclosure may be tightly coiled. Glass optical fibers, on the other hand, are of extremely small diameter and are relatively fragile, therefore, optical fibers must be treated more carefully in placing them, and their splices, within an enclosure. Thus, transmission capabilities may be impaired if the fiber is bent to less than an allowable bending radius to the point where the transmitted light is no longer completely contained within the fiber. In addition, the fibers are brittle and do not possess the strength and resistance to breakage that metallic wire does, hence, when bent too sharply, the fibers may break. The breakage problem is exacerbated by minute, even microscopic surface fractures which are vulnerable to stresses on the fiber. Thus, a protective sleeve over individual fibers or fiber bundles is often necessary to minimize surface damage to the fibers, especially in the region of the splice.

It is clear, therefore, that optical fiber cable is not amenable to splicing using techniques applicable to wire type splicing. The glass fibers cannot be twisted, tied, or tightly coiled in the same manner as individual wires, nor can they be crimped or tightly bent without breakage. These problems are especially acute with multifiber cables where individual fibers must be spliced in a manner which allows subsequent or future repair or rearrangement, and the need for providing ample fiber slack to obviate sharp bends at the splice, which place stringent demands on the splice closure.

Inasmuch as, at the splice point, the cable is opened up and the base fibers exposed, the only protection afforded the fibers is provided by the closure, which can provide only one or two layers of protection from the outside environment, the requirements therefor are more stringent than for the cable, which normally provides several layers of protection. The closure must anchor all cables stored therewithin, and it must be capable of withstanding torsional and axial loads transmitted by the cable to the closure so that the splices are protected from these loads. The closure must also seal the inner and outer sheaths of the cables and maintain the seal integrity under extreme environmental conditions. The sealing must also provide a moisture barrier sufficient to prevent any moisture from reaching the fiber optic splices.

Additional requirements for the closure are its ability to provide adequate fiber storage for slack fiber without damaging the fibers and without increasing signal attenuation; the ability to store any type of splice, such as, for example, discrete or mass mechanical, or discrete or mass fusion type splices while dampening and reducing vibration and other forces that tend to damage the splice or splices; and the ability to provide adequate grounding for the metallic strength members of the cables. The closure must also have the capacity to accept the highest fiber count cables available on the market.

One such closure, designated the AT&T UCBI closure, has been commercially available for a number of years. The closure itself is offered to customers as a basic shell without the components for anchoring and sealing the cables, for routing and positioning the fibers, for housing and protecting the splices, for grounding the metallic strength members of the cables, and for encapsulating the closure itself within a protective shell. For the closure assembly to meet the desired criteria set forth in the foregoing, the various components to be used with the closure must be ordered separately. Thus, each customer orders specific kits designed to accommodate the particular size cables, number of fibers, and splices to be used. As a consequence, there is an entire catalog of components of varying sizes and designs from which the customer makes the necessary selections. Increasingly there has been a demand that closures be supplied with the necessary components included in one package, thereby relieving the customer of the necessity of "customizing" his particular closure with the required components, and it has become a desideratum in the optical fiber splice closure art that the components necessary to complete the closure, such as the fiber splitter for routing fibers, the splice trays for holding the splices, a grip assembly for anchoring the cables entering and leaving the closure and for grounding the metallic strength members, and an overall protective cover for encapsulating the closure which can be quickly mounted or removed, be capable of universal application, thereby accommodating virtually any size of cable within a specified range of cable sizes and any type of splice.

SUMMARY OF THE INVENTION

The present invention is directed to a splice closure having the various components to form a complete closure assembly, wherein the components are capable of handling a wide range of cable sizes and splice configurations. The invention is described hereinafter in terms of an assembly comprising the basic UCBI closure shell with a plurality of components of novel design and universal utility, but it is to be understood that the principles of the invention are applicable to other types of closures, that being discussed hereinafter being by way of example only.

The splice closure itself comprises a metallic base member and a cover which, when assembled, form an enclosure open at each end for receiving fiber optic cables to be spliced to each other. In the UCBI closure, each opening can accommodate two cables. Each of the cables entering and leaving the closure is anchored to the closure member by means of a grip block assembly which firmly grips the cable and which is mounted within the closure by means of a threaded stud and nut. The grip block assembly comprises a lower grip member having first and second pivoted arms and an upper grip member having first and second depending actuating pins which is mounted on the lower grip member by means of a clamping bolt. A grounding plate is attached to the upper grip member by means of the clamping bolt and bears against a grounding strap which, in the fully assembled state, bears against the metallic armor or strength member of the cable being gripped. When the partially stripped cable is inserted in the grip block assembly and the grounding strap is connected to the armored or strength member, the clamping bolt is tightened, forcing the upper grip member toward the lower grip member. The actuating pins, the ends of which ride in grooves in the pivoted arms, three the pivoted arms to pivot into contact with the cable which, in turn, forces the cable into a serrated arcuate groove in the upper grip member. Continued tightening of the clamping bolt and nut causes the combination of the V-shaped groove and the pivoted arms to grip the cable tightly, thereby anchoring it firmly in the closure housing. The grip block assembly is mounted on the cable between an inboard and an outboard grommet which are, in turn mounted in racetrack grommets forming part of a gasket between the base member and the cover of the closure housing. Thus, when the closure is assembled and the cover bolted to the base portion and sealant material has been applied, a moisture seal is formed at both of the open ends of the housing. In general, there are four grip block assemblies used with the splice closure to accommodate two entrant and two exit cables, although the grip block assembly itself is readily adaptable for use with other types of closures accommodating larger numbers of cables, for example.

The stripped end of the cable includes a large numbers of fiber bundles, either of the ribbon base type or the fiber base type, which must be separated and organized so that the individual fibers may be spliced to corresponding fibers in the exit cable. To this end, a fiber splitter is used to separate and route the fiber bundles. The splitter of the invention comprises a body portion of a clear or transparent rigid plastic material having, at one end, a plurality of hollow fiber bundle receiving axially extending hollow fingers arranged in two rows of six fingers each, with the fingers of one row being staggered relative to the fingers of the other row. The fiber bundles are each encased in plastic protection sleeves which fit over the fingers. A fiber finger insert having two more rows of similarly staggered fingers has depending ears with openings therein which are adapted to snap over projections on the splitter body to lock the insert in place over the first set of fingers thereby increasing splitter capacity to twenty-four bundles. In a second embodiment of the invention where fiber ribbons are to be used, the end of the splitter has a plurality of upstanding, spaced teeth defining fiber ribbon receiving spaces therebetween. Each ribbon is encased in an oval shaped sleeve, and the sleeves can be stacked vertically with vertical orientation in the spaces between the teeth. Thus, each splitter can accommodate twenty-four fiber bundles in the one embodiment, or twenty fiber ribbons in the other embodiment.

The other end of the body portion of the splitter, i.e., the cable end, has a split neck portion for receiving therein one end of a core tube insert. In accordance with the invention, a pair of slots in the interior walls of the neck portion are adapted to receive projections on the core tube insert to hold the core tube in position. The external diameter of the core tube insert is stepped, with a first, smaller diameter portion being adapted to fit inside of the core tube of the cable, with the end of the core tube butting against the step at the start of the larger diameter portion of the insert. Prior to insertion of the insert, a plastic protective sleeve having an inner diameter slightly greater than the outside diameter of the larger diameter portion of the insert is fitted over the core tube and is adapted to receive and hold the larger diameter portion of the insert. The stepped, tubular portion of the insert as noted before is split to form a slot extending along the length thereof to facilitate positioning the fiber bundles and to insure that the insert fits within the protective sleeve.

After the fiber bundles with their protective sleeves have been organized and inserted in the proper fingers or slots, a splitter cover is snapped into place on the splitter body portion. The cover is a flat member of preferably clear plastic having first and second depending slotted arms which are adapted to fit within corresponding recesses in the side walls of the splitter body. Within each recess is a projecting lug which is adapted to engage the slot in the corresponding arm of cover member to hold it firmly in place on the splitter body.

When the cable has been inserted into the grip block and the block, in turn, mounted in the closure, and when the individual fiber bundles have been sorted and organized in the splitter, the individual fibers are then spliced to corresponding fibers in the cable which either enters from the other end of the splice closure to form an in-line closure splice or the same end to form a butt splice. After the fibers have been spliced together it is necessary to store them in a container or splice tray for protection of the splices. The splice tray must also store the existing slack fiber that leads to and exits from the splice, without exceeding the maximum allowable bend (or minimum allowable bend radius) of the fiber. Thus, the splice tray must be capable of holding both splices and slack fibers in place against vibration, sudden impact, twisting, and the like.

In accordance with the invention, there is provided an elongated splice tray which is mounted within the base member upon first and second leaf extension support members, which are bolted to the interior of the base member and form supporting brackets for each end of the splice tray. Each extension member has, at one end thereof, a transverse pin which, in position, extends parallel to the longitudinal axis of the closure. At each end of the splice tray, at one bottom corner thereof, is a leaf member having a hole therein adapted to receive the pin on the extension member for holding the tray in place on the extension member. At the top of the same corner on the splice tray is located a pin oriented the same as the pin on the extension member so that a second splice tray may be mounted above and affixed to the first place tray. In this way, splice trays may be stacked within the enclosure.

The splice tray has, at each end thereof, a circular fiber storage hub with overlying retainers around which slack fiber is wound to prevent any slack fibers from lying loose in the tray. Centrally located in the tray are a pair of receptacles for receiving and retaining protective splice inserts which are adapted to be snapped into place within the tray. The inserts have a plurality of protective slots into which the individual splices are to be inserted and held in place by resilient means, and a plurality of fiber pass through channels for aligning and protecting the fibers leading to the splices. The splice tray is provided with a hinged transparent lid which completely covers the fibers and splices within the tray.

The assembly of splice closure is completed by the addition of the closure cover which is sealed and bolted to the closure base. The cover has resilient inserts therein which bear against the components mounted in the base to protect them from shock and other forces to which they might be subjected.

In certain environments the closure might be subjected to excess of moisture or to corrosive elements which severely tax the closure's primary function of providing a complete seal for the fibers and splices within the closure. Consequently, these is provided for the closure itself a protective shell which comprises a base portion and a cover portion which fit over and completely cover the closure within a defined interior space having a volume greater than the volume occupied by the closure. Both the base portion and the cover portion of the shell have longitudinally extending mating flanges adapted to be sealed together with a resilient grommet between the mating surfaces of the flanges. When the flanges of the base portion and the cover portion are placed in mating relationship, clamp members are slid along the flanges to clamp them together. In this way, the flanges are pressed tightly together the body and cover portions are maintained in fixed relationship. A knock-out hole is provided in the cover portion into which liquid encapsulant is poured which, after it sets, substantially completely fills the empty spaces within the cover assembly, and substantially completely encapsulates the splice closure, thereby protecting it from moisture and corrosive elements. The protective shell is the subject of U.S. patent application Ser. No. 08/267,686, filed Jun. 28, 1994 in the names of Denis S. Burek, Monty J. Edwards, and Charles McGonigal.

The splice closure assembly of the present invention as described in the foregoing, is universal in the sense that the components thereof can accommodate cables, fibers, and splices of varying sizes and configurations without alteration, thereby eliminating the necessity of "customizing" the splice closure for the particular use to which it is to be put.

The numerous features and advantages of the present invention, as well as the principles thereof, will be readily apparent from the following detailed description, read in conjunction with the accompanying drawings.

DESCRIPTION OF THE DRAWINGS

FIG. 14 is a plan view of the splice holder for use in the splice tray of FIG. 10;

FIG. 15 is a plan view of one component of the splice holder of FIG. 14.

DETAILED DESCRIPTION

Figure 1:
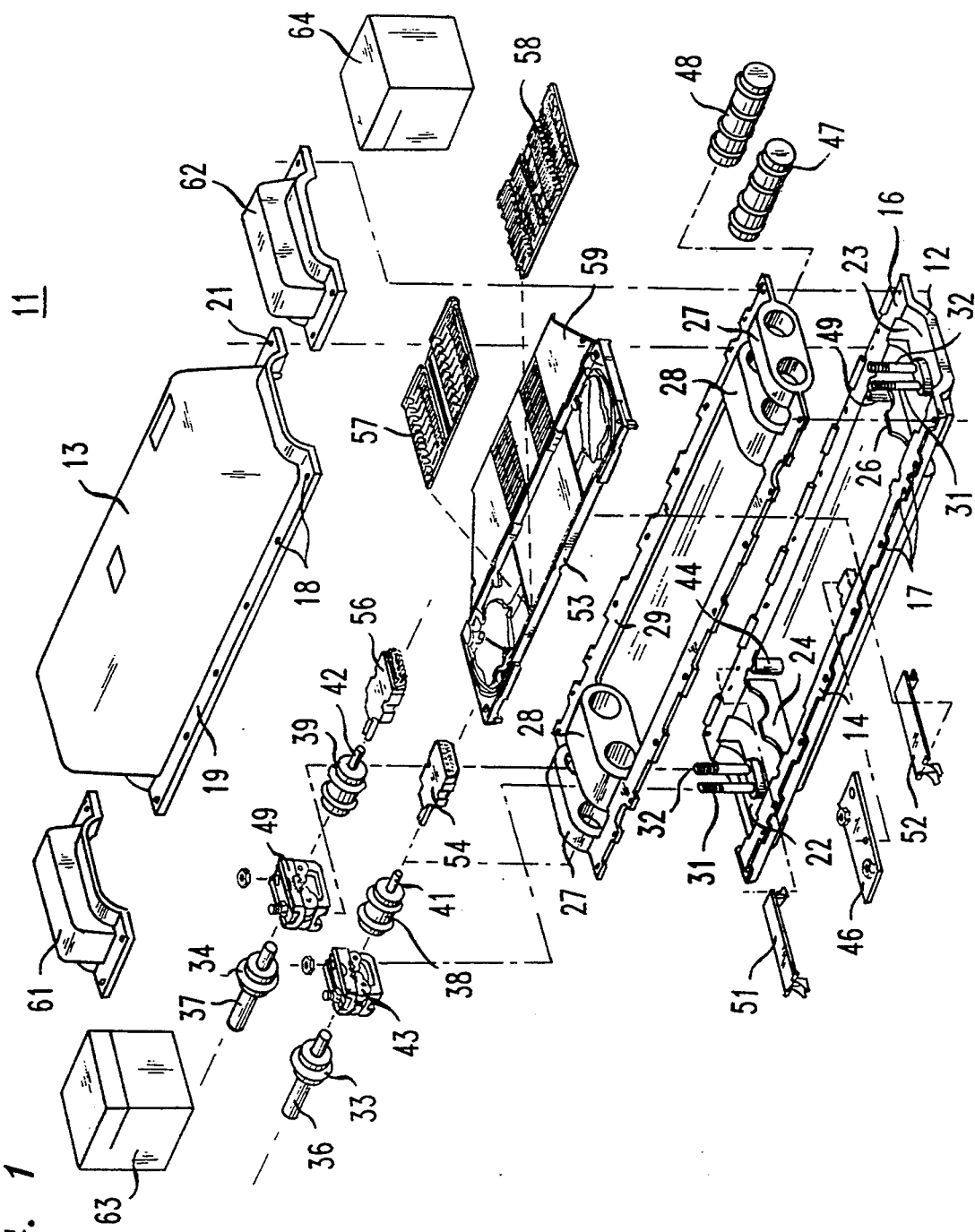
FIG. 1 is an exploded perspective view of the splice closure of the present invention.

In FIG. 1 there is shown an exploded view of a splice closure 11, more particularly, an AT&T UCB1 type of closure, and the various component parts which, when assembled, make up a complete closure assembly.

Closure 11 comprises a base portion 12 and a cover portion 13 which is designed to be bolted to base portion 12 after the components have been assembled with the cables, fibers, and splices, none of which are shown, in their assigned positions. Base 12 has a trough-like configuration with first and second longitudinally extruding flanges 14 and 16 having a plurality of bolt holes 17, 17 which match corresponding bolt holes 18, 18 in flanges 19 and 21 of cover 13 for securing the latter thereto. First and second end compartments 22 and 23 are formed in base 12 by means of walls or septa 24 and 26, respectively, which have semi-circular cut-outs therein for receiving the universal grommet receiving seal members 27 and 28 of a race-track grommet 29. Grommet 29, which is made of a suitable flexible, compressible urethane material also functions as a sealing gasket between the flanges 14 and 19 and 16 and 21 of the base 12 and cover 13. In each of compartments 22 and 23 is a pair of threaded studs affixed to base member 12. Grommet receiving members 27 and 28 are spaced apart and studs 31 and 32 extend therebetween. At one end of base 12 grommet receiving member 27 is adapted to receive outboard grommets 33 and 34 which hold optical fiber cables 36 and 37, and grommet receiving member 28 is adapted to receive inboard grommets 38 and 39, which hold optical fiber bundles 41 and 42. Located between members 27 and 28 are first and second universal grip blocks 43 and 44, which are mounted to studs 31 and 32 respectively, as will be discussed more fully hereinafter, and which both anchor cables 36 and 37 and supply a grounding path for the metallic parts thereof. An additional grounding member, plate 46, is mounted as by bolting to base 12 and functions primarily to ground the central strength member of those cables which have such. In the case where the fibers of cables 36 and 37 are to be spliced together, the other end of base portion 12 has first and second grommet plugs 47 and 48 which are insertable in the receiving members 27 and 28 to help seal that end of the assembly. It is equally possible that cables may be introduced into that end of the base 12, in which case plugs 47 and 48 are not used, and a grommet and grip block assembly like that at the other end is used for anchoring, grounding, and sealing the ends of the closure.

Also mounted on base 12 by bolting to four bosses 49, only two of which are shown, formed therein, are first and second leaf extension support members 51 and 52 which are adapted to receive and support a splice tray 53, or a stack of such trays, as will be discussed more fully hereinafter. Interposed between fiber bundles 41 and 42, and splice tray 53, and first and second fiber splitters 54 and 56 which, as pointed out hereinbefore, are used to separate and route the individual fibers and fiber bundles. As with the other components shown in FIG. 1, the splitters 54 and 56 will be discussed in greater detail hereinafter. The fibers thus arranged and segregated are then inserted in splice tray 53, with the splices themselves, whether of the rotary type or the butt type, being contained in either one of two splice tray inserts 57 or 58, depending upon the type of splice used, and the lid 59 of tray 53 is snapped shut.

First and second clamp members 61 and 62 are bolted to base portion 12 and cover and seal the regions 22 and 23 with the grommets and grip blocks in place. A pair of blocks 63 and 64 of resilient material are inserted into cover 13 which is then bolted in place onto base member 12, thereby completing the splice closure assembly 11.

The splice closure assembly 11 of FIG. 1, with the various components shown, is a universal closure in the sense that it is capable of insuring a sealed protective environment for splices of varying sizes and configurations without the necessity of "customizing" the various components, and can accommodate a wide range of cable and fiber sizes and configurations. As will be apparent hereinafter, certain key ones of the components are also universal in the same sense and contribute to the overall versatility and utility of the splice closure.

Grip Block Assembly

The mechanism used to anchor cables in the splice closure 11 of FIG. 1 as well as other types of such closures is the grip block assembly, depicted as elements 43 and 44 in FIG. 1. Torsional or axial loads transmitted by the fiber optic cable are isolated by the grip block assembly and prevented from reaching and disturbing the fiber optic splices. The grip block also must provide means for grounding the metallic parts of the cable to the metallic closure. In accordance with the universatility requirement as discussed hereinbefore, the grip blocks 43 and/or 44, in addition to withstanding one hundred pounds (100 lbs.) pull out cable load and one hundred eighty degrees (180°) cable rotation, must be capable of anchoring all fiber optic cables from approximately 0.40 inches diameter to 0.96 inches diameter with the cable, regardless of size, centered in the grip block so as to be coaxial with the grommet receiving members 27 and 28. In addition, the grip blocks must be capable of grounding all fiber optic cables within the aforementioned range having metallic shielding or metallic strength members, or both.

Figure 2:
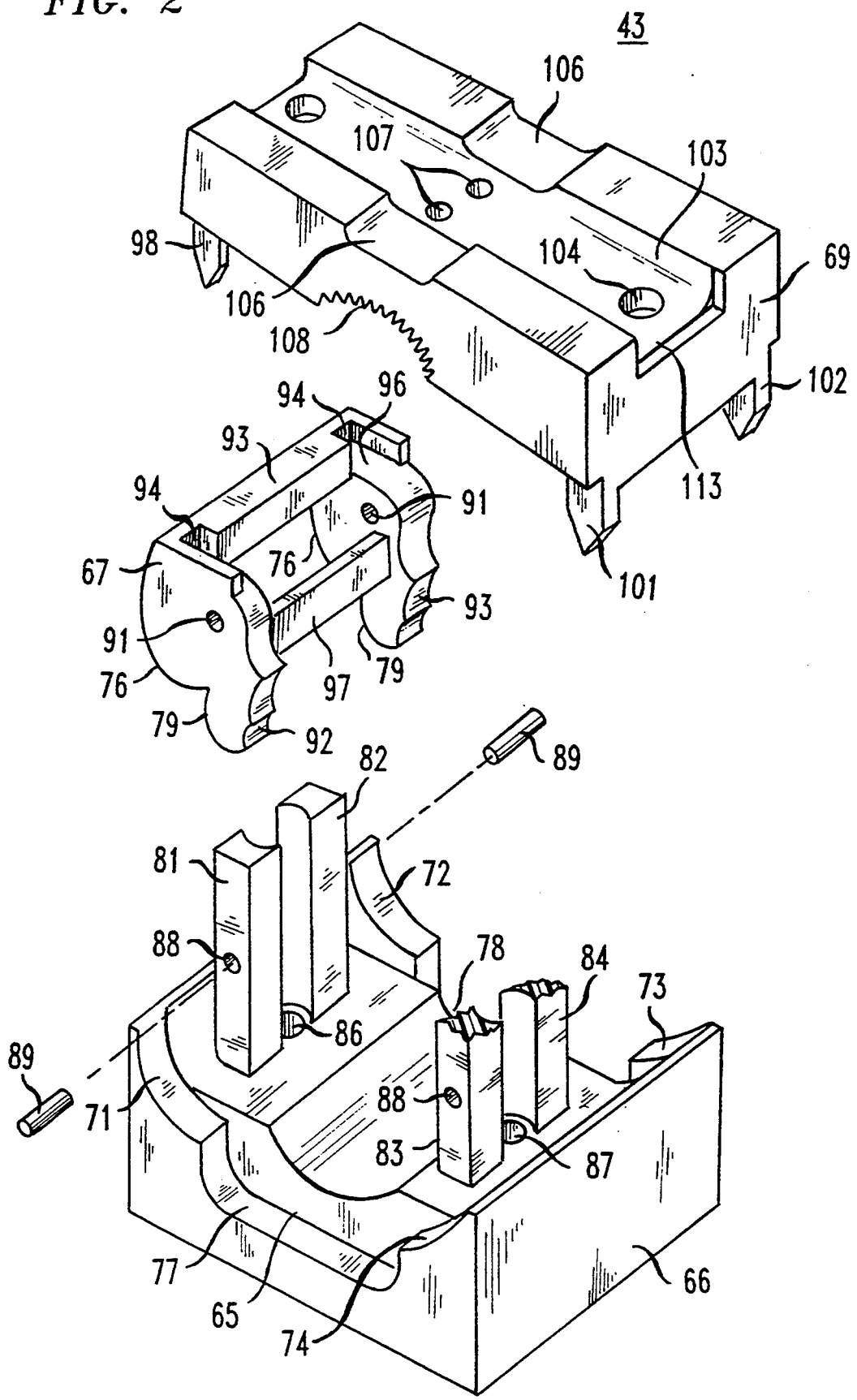
FIG. 2 is an exploded perspective view of the grip block of the present invention.

In FIG. 2 there is shown a perspective view of a portion of the grip block assembly 43. It is to be understood that all grip blocks to be used with splice closure 11 are identical with the possible exception of the cable grounding arrangement, as will be discussed hereinafter. It should be understood further that the grip block assembly 43 is adaptable for use with splice closures other than the UCB1 or UCB2 closures, although the following discussion is directed to use of the grip block with either the UCB1 or UCB2 closures.

Figure 3A:
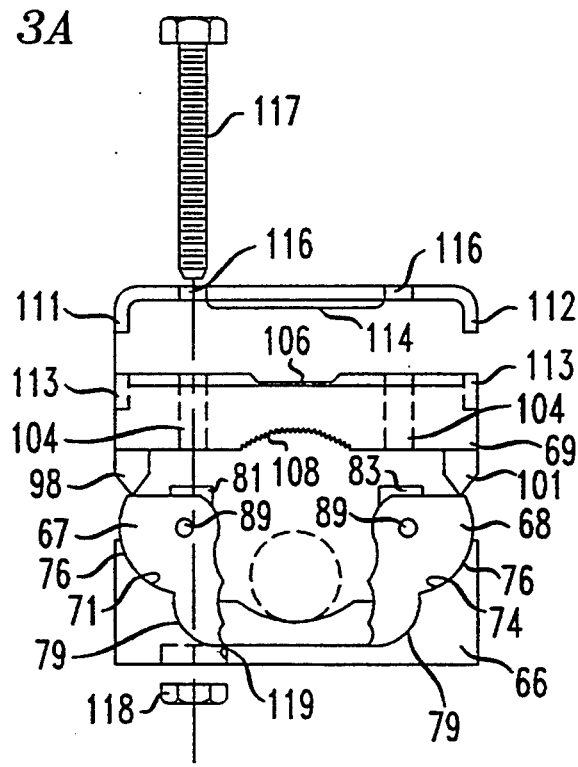
FIGS. 3A and 3B are elevation views of the grip block of FIG. 2.
Figure 3B:
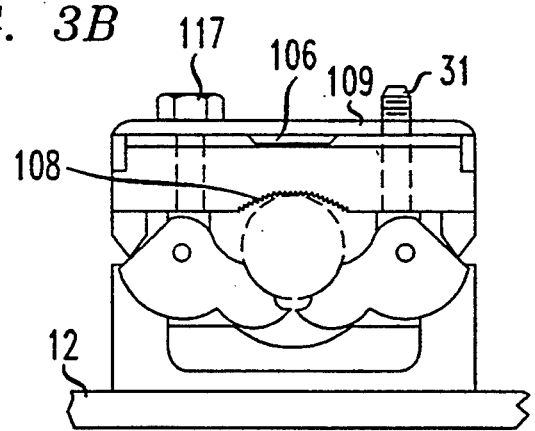

Grip block 43 comprises a base member 66, preferably of suitable plastic material, first and second cable engaging pivoted levers 67 and 68 (for clarity only lever 67 is shown in FIG. 2), and a cap member 69. Base member 66 has arcuate bearing surfaces 71, 72, 73, and 74 formed thereon upon which partially circular lobes 76, 76 of levers 67 and 68 ride, as best seen in FIGS. 3A and 3B. Member 66 also has cut out portions 77 and 78, the ends of which are shaped to accommodate tangs 79, 79 on levers 67 and 68. Base member 66 also has an arcuate cut-out portion 65 upon which the cable to be gripped initially rests, as best seen in FIG. 3A. First and second columns 81 and 82 and third and fourth columns 83 and 84 extend upwards from base 66, with columns 81 and 82 positioned on either side of a bolt hole 86 and columns 83 and 84 on either side of a bolt hole 87. Both holes 86 and 87 extend completely through base member 66. Columns 81, 82, 83 and 84 have bores 88,88 therein, only two of which are shown, to receive pivot pins 89,89 which extend through bores 91,91 in levers 67 and 68, thereby pivotally mounting levers 67 and 68 to the columns 81, 82, 83, and 84.

The front surfaces of the tangs 79,79 of levers 67 and 68 have first and second arcuate portions 92,92 which, as best seen in FIG. 3B, are adapted to engage the cable being gripped by grip block assembly 43. The lobes 76,76 are connected by a first transverse member 93 having cut out portions 94,94 which provide access to camming surfaces 96,96 on the tops of lobes 76,76, only one of which is shown in FIG. 2. Lobes 76,76 are also joined by a strength member 97.

Cap member 69 comprises a rectangular member having for depending actuating pins 98, 99, 101, and 102 at the corners thereof, which are pointed, as shown, and which are adapted to bear against the camming surfaces 96,96 of levers 67 and 68. The top surface of cap member 69 has an arcuate recess 103 extending along its length, the purpose of which will be discussed hereinafter. Bolt holes 104,104, only one of which is shown in FIG. 2, extend through cap 69 and are adapted to be aligned with holes 86 and 87 when cap member 69 is in place in the assembly. The top of cap member 69 also has a transverse recess 106 extending thereacross which will also be discussed hereinafter. A pair of holes 107,107 are drilled through cap member 69 and are aligned with recess 106, as shown. The bottom surface of cap member 69 has a transverse toothed serrated arcuate cut-out portion or groove 108 which is adapted to grip the cable being held by grip block 43, as best seen in FIG. 3B. Although the serrations are shown as extending longitudinally of cut-out 108, they may, and preferably do, extend transversely thereof, i.e., normal to the longitudinal axis of the cable, thereby resisting axial stress on the cable. Alternatively, the serrations may be of knurled configuration, thereby affording maximum resistance to both transverse and axial stresses on the cable.

FIG. 3A is an elevation view of grip block 43 prior to its assembly, with a cable, shown in dashed lines, in place resting in cut-out portion 65. In addition to the components depicted and discussed with reference to FIG. 2, the grip block assembly 43 includes a bonding plate 109 having bent ends 111 and 112 which fit into cut-out portions 113,113 in cap 69. Plate 109 has a longitudinally extending V-shaped rib 114 which rides in arcuate cut-out portion 103 of cap 69. Bolt holes 116,116 align with bolt holes 104,104 in cap 69, and an assembly bolt 117 passes holes 116, 104, and 86, and mates with a nut 118 which rests in a shaped recess 119 in base 66. The other bolt holes 116, 104, and 87 permit passage of one of the threaded studs 31 or 32 for anchoring the grip block assembly to the base portion 12 of closure 11 by means of a nut, not shown. As bolt 117 is tightened, pins 98, 99, 101 and 102 bear against the camming surfaces 96,96 of levers 67 and 68, forcing the levers to pivot around pins 89,89 to bring surfaces 92,92 into engagement with the cable. Further tightening lifts the cable into engagement with the serrations in recessed portion 108 and the cable is held firmly between levers 67 and 68 and cap 69, as best seen in FIG. 3B. It can be seen that the cammed lever arrangement insures that the cable is centered within the grip block and tightly held thereby.

Figure 4:
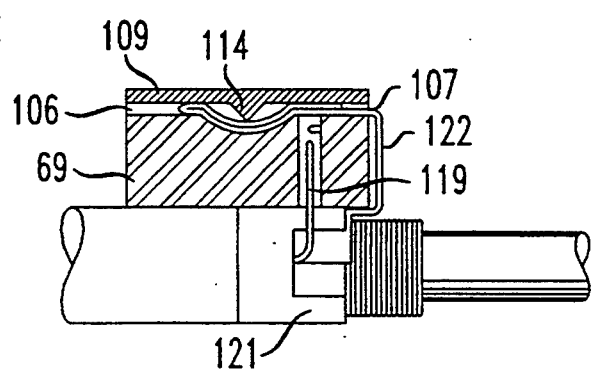
FIG. 4 is a detail of the cable grounding lug disposition in the grip block of FIG. 2.

As was previously discussed, an important function of the grip block assembly is to provide a secure grounding means for the metallic parts of the cable. In FIG. 4 there is shown a partial cross-sectional view of a grounding arrangement for use with a cable having a metallic shielding member 118 and steel strength members 119, only one of which is shown. A grounding clip 121 is crimped around member 118 after the cable has been stripped to expose member 118, and one end of a grounding lug 122 is inserted between member 118 of the cable and clip 121, making good metallic contact with each. With some types of cable the grounding clip 121 is not necessary and the end of the grounding lug 122 is inserted between member 118 and the next adjacent outer layer of the cable. After insertion, lug 122 is bent upward and into slot or recess 106 and then bent back upon itself, as shown. When cap 69 is tightened down, the V-shaped rib 114 of plate 109 bears against the folded lug 122, deforming it into cut-out portion 103 and thereby insuring positive metallic contact between plate 109 and lug 122. Thus, a solid ground path is established between metallic member 118 and closure base 12 through lug 122, plate 109, and stud 31 with its nut in place. Strength members 119,119 are bent upward into holes 107 as shown, and, because of their relative rigidity, function to assist in holding the grip block from shifting or otherwise moving.

Fiber Splitter

When the end of an optical fiber cable is opened and prepared for splicing, it is essential that the individual fibers be protected and organized for easy accessibility when the closure is re-entered. Additionally, they must be protected from possible damage resulting from subsequent splicing procedures. These desiderata are best achieved through the use of a fiber splitter, which fits onto the end of the cable and separates and routes the fibers along individual paths. Heretofore, separate or individual splitters, depending upon the number and type of fibers to be organized, have been made available upon order. In accordance with the universatility concept of the present invention, the splitter is made to accept, without alteration, any number of fibers up to a maximum, in multiples of twelve.

Figure 5:
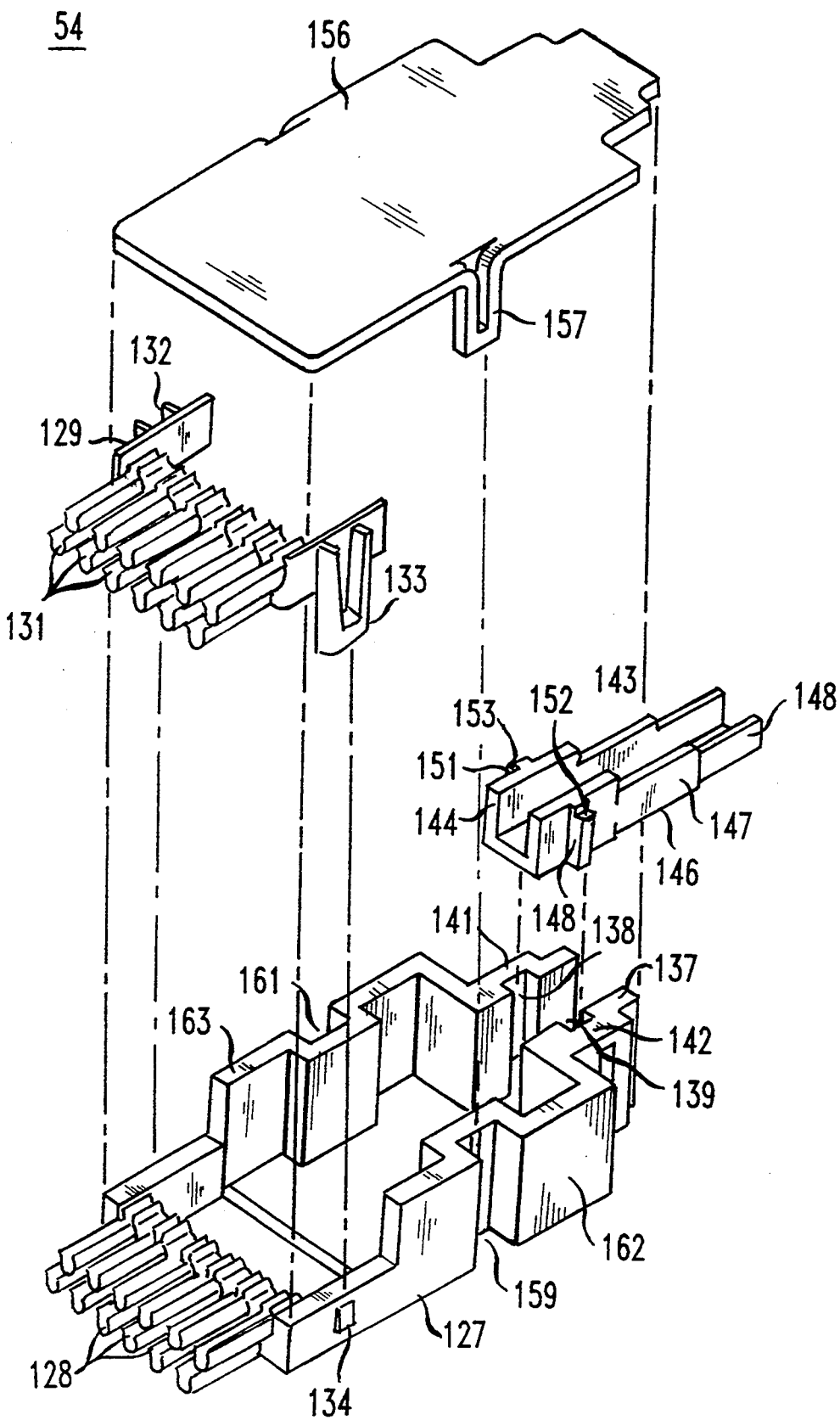
FIG. 5 is an exploded perspective view of the splitter of the present invention.
Figure 6:
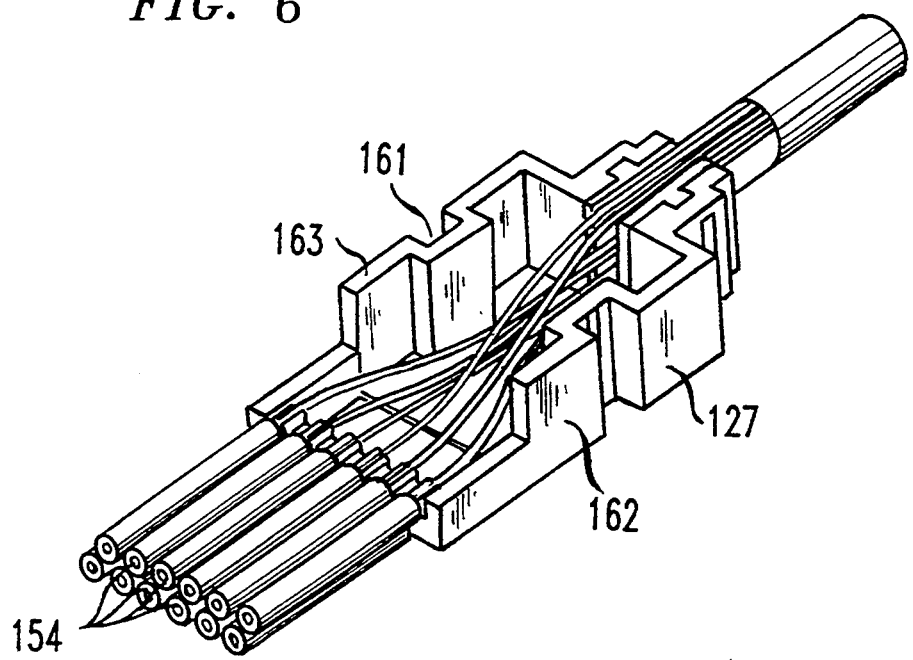
FIG. 6 is a perspective view of a portion of the splitter of FIG. 5, with optical fibers in place.

In FIG. 5 there is shown a first embodiment of the splitter of the invention for separating and routing twenty-four fibers. The splitter 126 comprises a base member 127 of preferably a clear plastic material such as a hard transparent polycarbonate, having affixed thereto a first set of twelve hollow split, substantially tubular fingers 128,128 arranged in two rows, one superposed over the other, wherein the fingers in one row are laterally offset from the fingers in the other row, as shown. Each of the fingers 128 is in the form of a split hollow cylinder and is adapted to receive an individual fiber, as shown in FIG. 6. A second set of fingers in the form of a fiber insert member 129, having two rows of split fingers 131,131, staggered in the same manner as fingers 128, has first and second depending latching members or ears 132, 133. As can be seen in FIG. 5, ear 133 is bifurcated to form a roughly U-shaped member which is adapted to fit over a projecting wedge shaped lug 134 on base member 127. Ear 132 is constructed in the same manner to fit over a lug 136, not shown, so that insert 129 can be snapped into place in superposed relationship to the first set of fingers 128,128 and firmly held by the projecting lugs 134 and 136 which bear against the transverse portion of the U-shape.

Base 127 has a neck portion 137 which has first and second opposed vertical slots 138 and 139, each slot being bridged at the top thereof by bridges 141 and 142. The slots form opposed channels, as shown in FIG. 5. A core tube insert member 143 has a body portion 144 having substantially U-shape, and a tube insert member 146 extending therefrom. Insert member 146 has a first section 147 in the shape of a split hollow cylinder and extending therefrom a section 148 of lesser diameter or cross-section than cylinder 147. Section 148 is adapted to be slipped into the core tube of the cable, as shown in FIG. 6, with the end of the core tube butting against the step formed between sections 147 and 148. Body portion 144 has first and second protruding ribs 149 and 151 having notched ends 152 and 155 respectively. Ribs 149 and 151, when insert member 143 is joined to base member 127, are inserted into vertical slots 138 and 139, and notches 152 and 153 snap under bridges 142 and 141 respectively to hold the two parts firmly together.

In use, insert 143 is positioned under the fiber core tube as shown in FIG. 6, and the individual fibers of the cable are routed to the proper fingers 128, 128 and 131, 131. Suitable plastic tubes 154, 154 are placed over the fingers 128, 128 and to protect the bare fibers from possible damage. After the fibers have been sorted and routed, a transparent cap 156 is mounted on base member 127. Cap 156 has first and second latching members 157 and 158, only 157 being shown in FIG. 5, which as in the manner of latching ears 132 and 133 are bifurcated to form a U-shaped latching member. Base member has first and second wedge shaped projections, not shown, over which ears 157 and 158 snap when cap 156 is pressed down onto base member 127, and which hold cap 156 firmly in place. The wedge shaped projections are located in channels 159 and 161 formed in the upstanding side walls 162 and 163 of base member 127.

Figure 7:
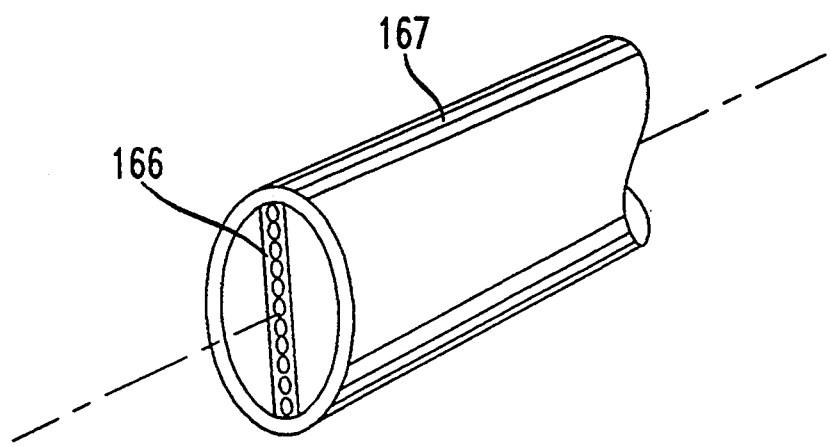
FIG. 7 is a detail of a ribbon type optical fiber assembly.
Figure 8:
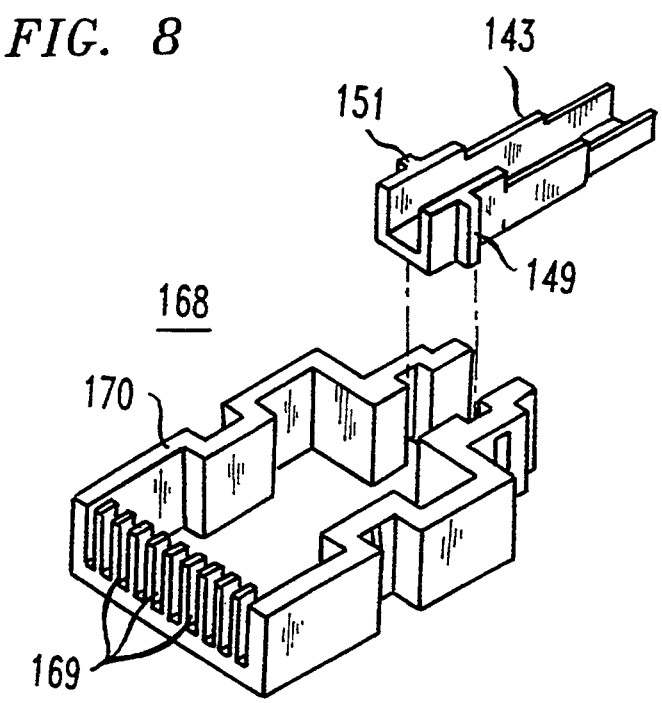
FIG. 8 is a perspective view of the splitter as adapted to handle ribbon fibers of the type shown in FIG. 7.
Figure 9:
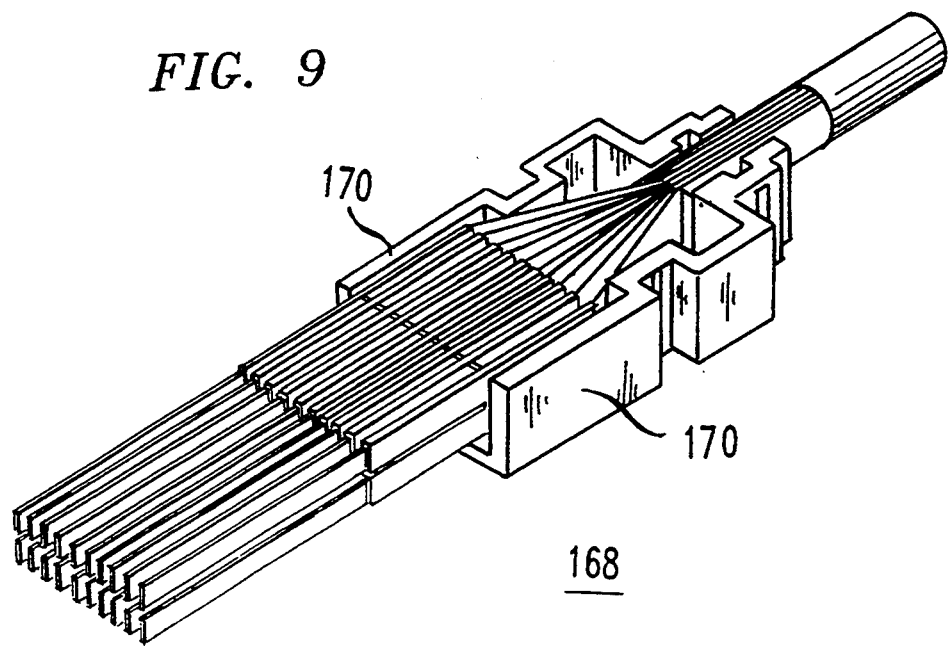
FIG. 9 is a perspective view of the modified splitter of FIG. 8 with the ribbons in place.

In FIGS. 8 and 9 there is shown the splitter 54 as modified to accommodate ribbon type optical fiber groupings, as shown in FIG. 7. Each such ribbon 166 has twelve fibers aligned in a side by side arrangement, and the ribbon 166 is encased in a suitable oval shaped protective tube 167. The principal aim of the splitter 168 of FIG. 8 is to allow the individual ribbons 166 to be separated and organized for subsequent splicing and, to this end, splitter 168 has a base member 170 having, at the exit end thereof, a comb-like structure of a plurality of upstanding spaced fingers 169, 169 forming slots for receiving the encased ribbons. As shown in FIGS. 8 and 9, each slot can hold two encased ribbons stacked one on top of the other, and the ten slots can therefore accommodate twenty encased ribbons, or a total of two hundred and forty individual fibers. In all other respects, splitter 168 is substantially identical to splitter 54 of FIGS. 5 and 6. In practice, the bases 127 and 170, the insert 143, the member 129 and the cap 156 are cast of clear or transparent acrylic, for example, in a parts tree from which they are individually removable. Thus, the user has a available all of the necessary components for a splitter accommodating a plurality of individual fibers or a splitter accommodating a plurality of fiber ribbons.

Because the splitter of the invention is extremely compact, in those cases where large number of fibers or ribbons are to be sorted and routed, a plurality of splitters may be used, there being sufficient space in the splice case 11 to accommodate such a plurality of splitters.

The splitter as shown in FIGS. 5 through 9 is the subject of U.S. patent application Ser. No. 08/263,707, filed concurrently herewith on Jun. 22, 1994 in the names of Denis E. Burek, Marc D. Jones and Philip M. Thomas.

Splice Tray

After optical fibers have been spliced, it is necessary that they be stored and protected, and that the slack fiber on either side of the splice be stored in a manner such that the critical bend radius of the fiber is not exceeded, i.e., that the bend radius not be too small, thereby making sharp bends. Both the splices and the slack fibers must be held in a place despite vibration, impact shock, twisting, and water immersion, for example. To this end, the splice tray 53 depicted in Fig. 1 is used. The splice tray 53, as will be discussed more fully hereinafter, is designed to accept mechanical, fusion, and rotary splices, with a capacity of twenty-four splices. Further, the splice tray 53 is designed to hold and protect virtually any commercially available splice.

Figure 10:
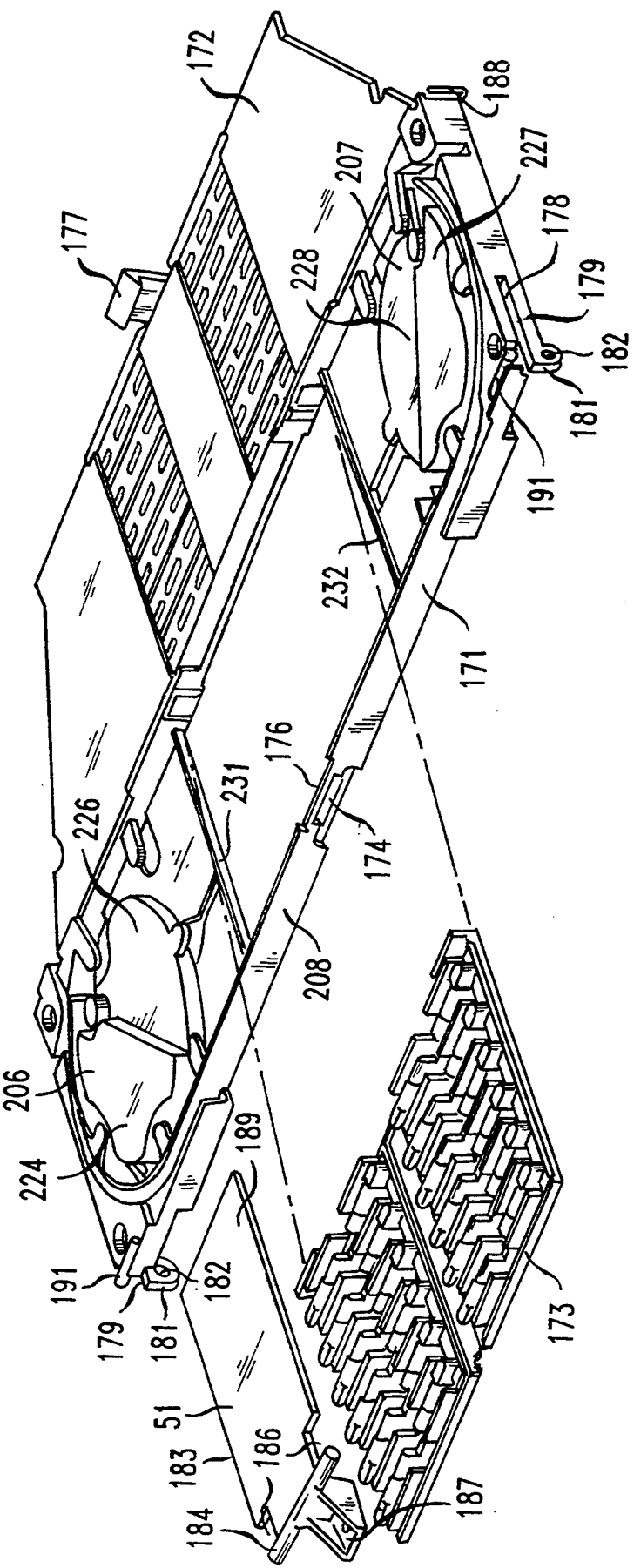
FIG. 10 is a perspective view of the splice tray of the present invention.
Figure 11:
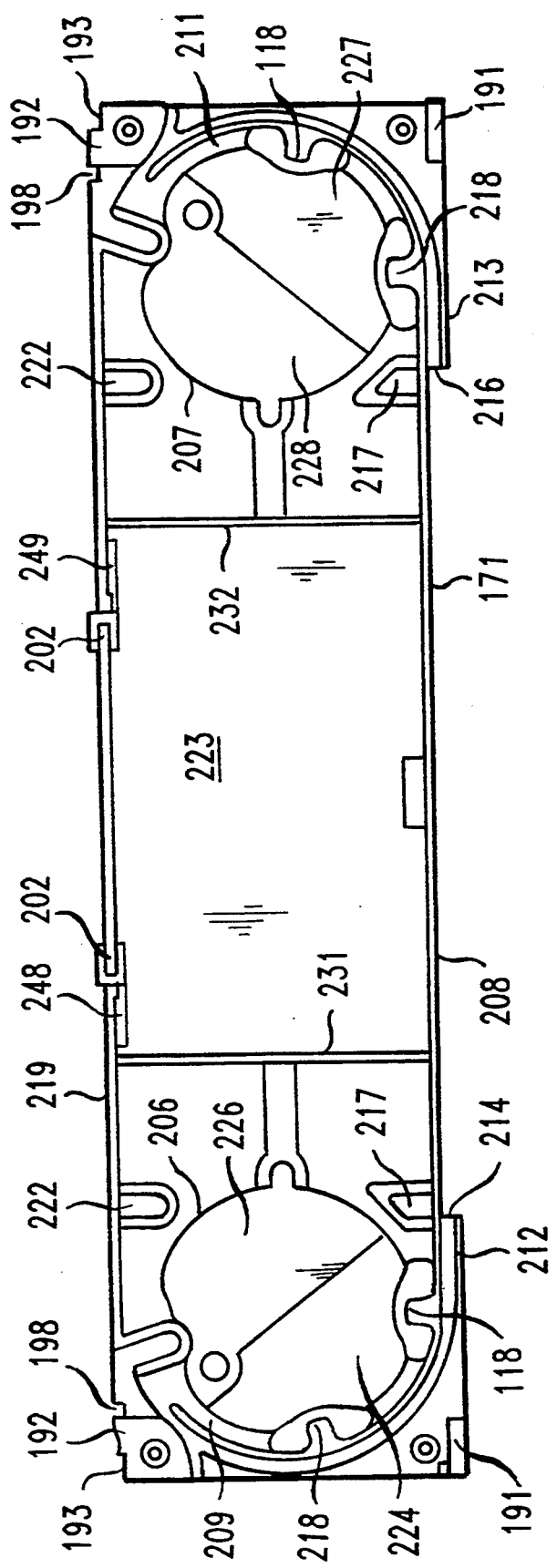
FIG. 11 is a plan view of the splice tray of FIG. 10.

In FIG. 10 there is shown an exploded perspective view of the splice tray 53 of the invention, which comprises a base member 171 of suitable rigid plastic material having a longitudinal axis as seen in FIG. 11, a top plate or cover 172 of clear Lexan ® plastic, for example, and a splice holder 173 (either element 57 or 58 in FIG. 1) adapted to be snapped into place and firmly held in base member 171. This is in contrast to certain prior art splice trays wherein the splices are held in the lid of the splice tray. With the splices thus located in the lid opening and closing, the lid imparts a twist to the fibers leading to the splice, which is undesirable. With the splices held in the base portion of the tray, such twisting of the fibers is eliminated. The front wall 208 of base member 171 has a cut-out portion 174 having a bridge 176 across the top thereof for receiving a latch member 177 on cover 172. Cover 172 is pivotally mounted on base member 171 in a manner to be discussed hereinafter, and when cover 172 is pivoted over base member 171 to close the case or tray 53, the wedge shaped latch member 177 engages bridge 176 and opening 174 to latch the cover to the base.

As was pointed out hereinbefore, splice tray 53 is, in use, mounted on mounting members 51 and 52, mounting member 51 being shown in FIG. 10. At each end of base member 171, the end wall has a split 178, 178 therein, thereby forming leaves 179, 179, each of which has a depending leaf 181, 181 with a bore 182, 182 extending therethrough. Support member 51, and identical support member 52, not shown, comprises a flat plate 183 at the front end of which is a transversely extending pivot pin 184, which is adapted to fit within bore 182 on leaf 181 of member 179. Plate 183 has cut outs 186, 186 immediately adjacent pin 184 to allow leaf 181 to fit therein. On either end of plate 183, is a depending mounting bracket or stand-off 187, which is bored (as shown) to permit passage of a mounting bolt for mounting support member 51 on base member 12. At the rear of each end wall of base 171 is a latch member 188 configured in a manner similar to latch 177. When support members 51 and 52 are in place and tray 53 is to be attached thereto, the resiliency of leaves 179, 179 make it possible to insert pins 184, 184 into bores 182, 182, thereby affixing the front of tray 53 to support members 51 and 52, with the natural recovery forces of the leaves 179, 179 holding them firmly on pins 184,184. At the same time, the resiliency of latches 188, 188 allow them to snap down over the rear end 189 of plate 51 and to grip it, thereby affixing the rear of tray 53 firmly in place.

In those cases where more than twenty-tour splices are to be accommodated, it is necessary to use more than one splice tray. In order that the splice trays may be stacked one on top of the other, tray 53, which is the configuration of all trays to be used, has, at the front corners thereof directly above leaves 181, 181, mounting pins 191, 191, which perform the same function as pins 184, 184 on support members 51 and 52. At the rear upper corners of base 171 and top members 192, 192, each having a rear edge 193 which is adapted to receive latch 188 to lock each succeeding tray to the immediately preceding one. As a consequence, a plurality of trays may, where the number of splices dictates, be stacked on top of each other and locked in place. The resiliency of leaf members 179, 179 and latches 188, 188 is such that the stack of trays can readily be disassembled when necessary.

Figure 12:
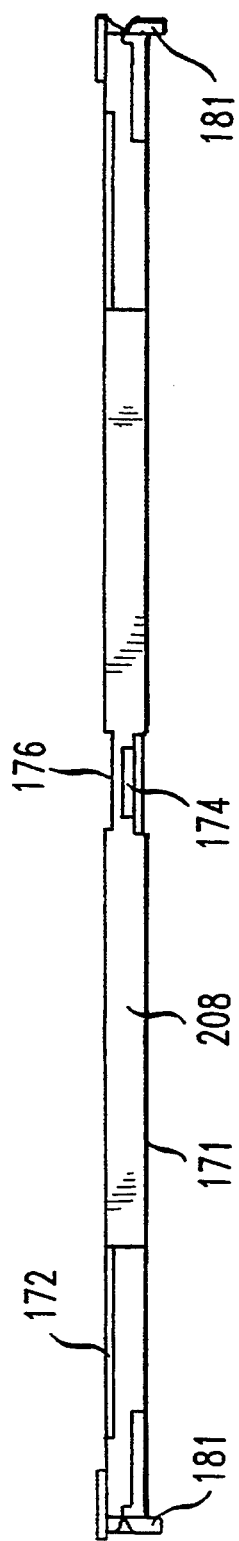
FIG. 12 is a front elevation view of the splice tray of FIGS. 10 and 11.
Figure 13:
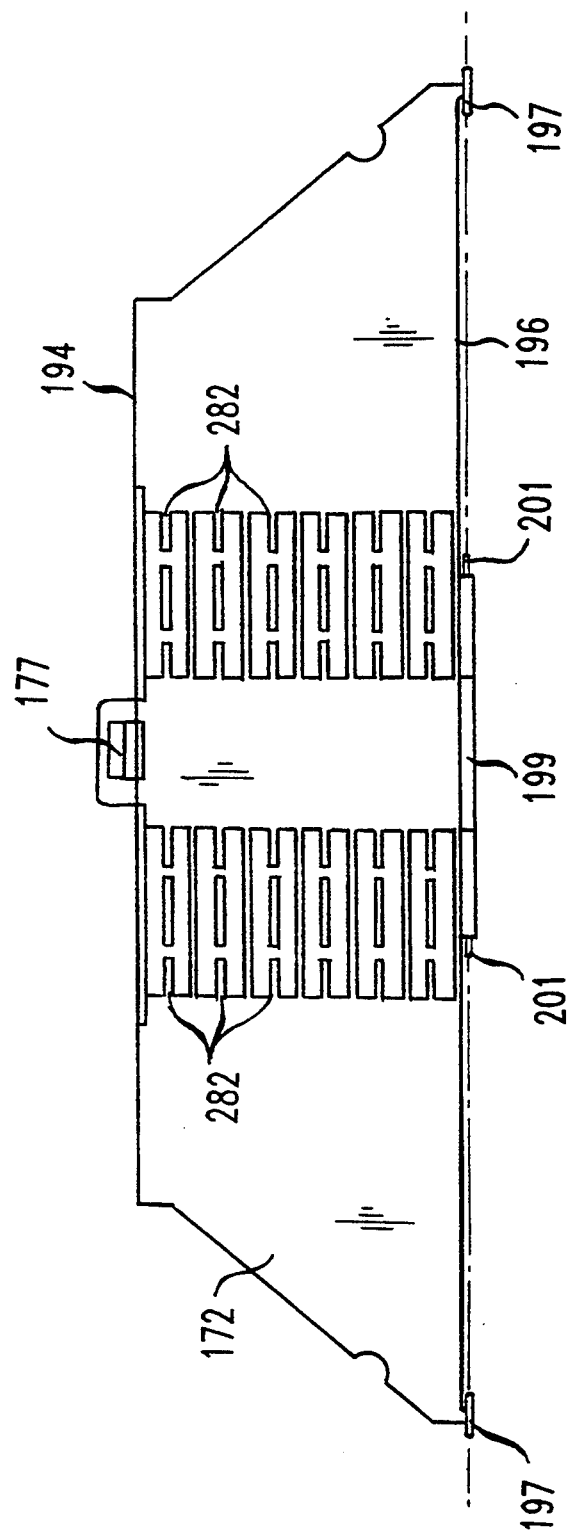
FIG. 13 is a plan view of the underside of the lid or cover of the splice tray of FIG. 10.
Figure 16:
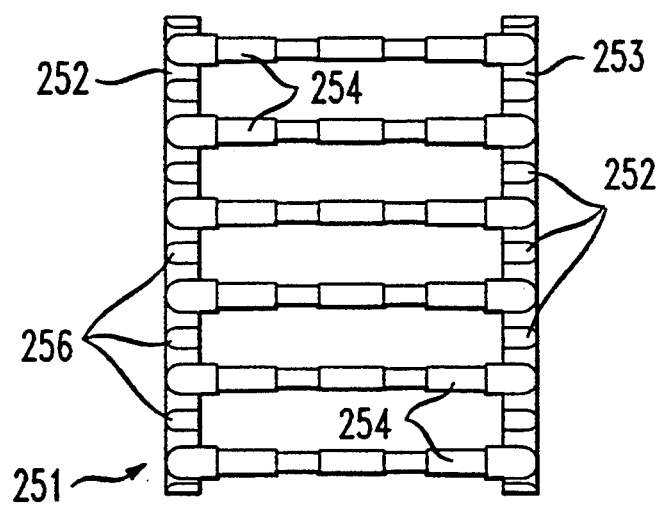
FIG. 16 is a plan view of another component of the splice holder of FIG. 14.

With reference to FIG. 13 as well as FIGS. 10 through 12, top cover 13 comprises a transparent sheet of material such as Lexan ® having a forward or front edge 194 upon which latch member 177 is mounted to depend therefrom, and a rear edge 196, with the sheet having a trapezoidal shape, as shown. At each end of the edge 196 are pins 197, 197 which are adapted to fit within slots 198, 198 at the rear of base member 171. A cylindrically shaped member 199 depends from the central portion of edge 196 and the ends thereof terminate in pins 201, 201, which are adapted to fit within spaced slots 202, 202 in the rear wall of base member 171. Slots 198, 198 and 202, 202 are such that the pins 197, 197 and 201, 201 must be forced into them and are then held by the natural resilience of the plastic material. Thus, cover 172 is mounted to the rear wall of base member 171, but is free to pivot with respect thereto to allow opening and closing of cover 172.

At each end of the base member 171 are circular hubs 206 and 207 the radius of which is greater than the critical bend radius for the optical fibers. The front wall 208 of base member 171 extends part way around the hubs 206 and 207 to form inner tracks or channels 209 and 211 seen in FIG. 11, and the end portions 212 and 213 of base member 171 form, together with wall 208, arcuate outer tracks or channels 214 and 216, respectively. Front wall 208 is formed with protective tabs 217, 217 and 218, 218 which extend from the top of the wall over the inner channels 209 and 211, and the rear wall 219 of base member 171 has formed thereon protective tabs 221, 221 which also extend over inner channels 209 and 211. As will be apparent hereinafter, when the fibers are passed around hubs 206 and 207, tabs 217, 217 and 218, 218 function to retain them within the channels 209 and 211, thereby minimizing possible damage that would result in the fibers. Also, the hubs 206 and 207 prevent the fibers from being bent to a radius equal to or less than the critical bend radius, below which the fibers can crack or break. Rear wall 219 also has formed extending from the top thereof, protective tabs 222, 222 which perform a similar function as the fibers are passed into the splice area 223. Outer channels 214 and 216 serve to introduce the fibers from the splitters 54 and 56, for example, into the inner channels 209 and 211, respectively. In practice, the fibers from the splitters are encased in plastic protective sleeves entering channels 214 and 216, with the sleeves extending part way along the outside channels 214 and 216.

Hub 206 has a stepped top surface which results in an upper surface 224 and a lower surface 226. In like manner, hub 207 has an upper surface 227 and a lower surface 228. As can be seen in FIG. 11, the step in hubs 206 and 207 are angled relative to the longitudinal axis of the tray to accommodate the angled sides of cover or lid 172, so that it rests on surfaces 226 and 228 and is flush with surfaces 224 and 227 as seen in FIG. 12.

Base member 171 has, extending from front to back, a pair of spaced ribs 231 and 232, which define the splice area 223, and which serve to locate and fix the splice holder 173 in position within the splice area 223 of tray 53.

Splice holder 173 may be either one of two configurations, depending upon the types of splices to be held in place. There is a large number of different commercially available splices in use today, and each user of the optical fiber closure has its own preferences. For the most part, different splices are housed in protective enclosures of differing cross-sections and dispersions. Among the preferred types of splices are the AT&T CSL Mechanical, 3M Fiberlok ® Mechanical, Amp Mechanical, Seicor Mechanical, and a variety of fusion type splices. Less common, but still used to some extent, are the AT&T Rotary Mechanical and GTE Mechanical splices, both of which are physically larger than the listed more common splices. In U.S. Pat. No. 5,185,845 of Jones, there is shown a splice holder comprising a base member and a resilient insert member of a form plastic material which is adapted to grip and hold a plurality of splices in side-by-side relationship. The insert is capable of accommodating several different types of splices, with the splices themselves extending transversely of the splice tray. The foam insert provides positioning of the splice and protection thereto, yet allows easy insertion and removal. In the splice tray of the present invention, it is desired to eliminate as much bending of the fibers as possible, and yet have the tray be capable of holding twenty-four splices, within the standard dimensions of the tray and the splice closure itself. In accordance with the invention, the splice holder 173, as shown in FIG. 14 has a first row of twelve channels 236, 236 and a second row of twelve more channels 237, 237, each of the channels being capable of holding a single splice with its protective housing. The channels extend parallel to the longitudinal axis of base member 171 and hence of splice tray 53. In order that those fibers whose splices are to be held in, for example, channels 237, 237, can by-pass the channels 236, 236 without interference, a plurality of rigid pass through channels 238, 238 are provided which alternate with the channels 236, 236 as shown. In like manner, a plurality of rigid pass through channels 239, 239 alternate with channels 237, 237. The means by which the channels, both for the splices and for the pass through fibers are formed is best seen in FIG. 15 the base 241 of the splice holder comprises a rigid member of suitable plastic material, for example, having a length equal to the spacing of ribs 231 and 232 in base 171 of the tray, and a width approximately equal to the spacing between the front wall 208 and the rear wall 219 of base member 171 and a longitudinal axis which coincides with the longitudinal axis of base 171. Arrayed across the width of member 241 are a plurality of equally spaced pass through channels 238, 238 and 239, 239, formed by upstanding longitudinally extending rigid ribs 242, 242 and 243, 243. Member 241 is designed to fit within the space 223 between ribs 231 and 232 and front and rear walls 208 and 219, respectively. In order that member 241 be held or locked firmly in place, a latch member 244 is provided at the front thereof which latches into opening 174 of base 171. At the rear of member 241 are protrusions 246 and 247, which are designed to fit within openings 248 and 249, respectively of rear wall 219. With such an arrangement, the splice holder base 241 can be snapped into place in area or region 223 and securely held there.

Figure 17:
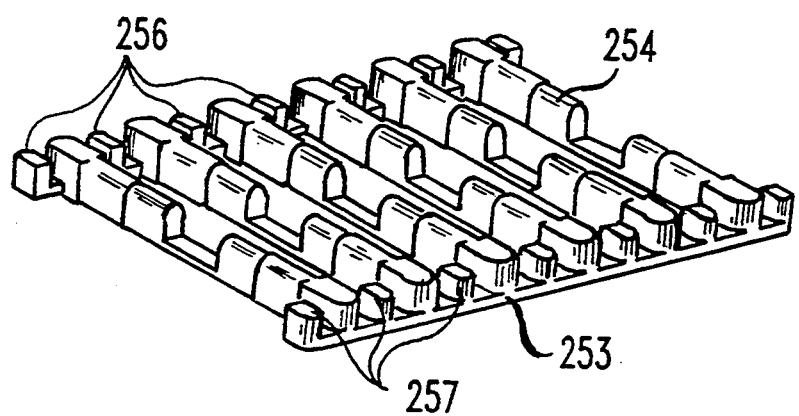
FIG. 17 is a perspective view of the component depicted in FIG. 16.

The splice holding channels 236 and 237 are formed in splice holder 173 by means of two foamed plastic or other suitable resilient material inserts 251 which, in some respects, is somewhat similar to the insert shown in the aforementioned U.S. Pat. No. 5,185,845 of Jones. Insert 251 comprises first and second spaced runners 252 and 253 which are spaced by a plurality of gripping members 254, 254. The spacing of the gripping members 254, 254 is such that a splice holding channel 236 or 237 is formed on either side of a pass through channel 238 or 239 when insert 251 is cemented in place on member 241, as best seen in FIG. 14. Located on the runners 252 and 253 and interspersed with and equally spaced from gripping member 254 are fiber holding members 256, 256 and 257, 257, which, as best seen in FIG. 17, are raised bosses. When member 251 is in place on base member 241, there is a holding member 256, 257 at each end of each pass through channel 238 or 239. When a fiber is passed through a pass through channel 238 or 239, it is held firmly within the channel by means of slits formed, as needed, in holding members 256 and 257 into which the fiber is inserted. FIG. 17 is a perspective view of the insert 251 for illustrating the configurations of the elements thereof.

After two of the members 251 are affixed in place, as by cementing to member 241 the complete splice holder, as shown in FIG. 14, is ready to be inserted in base 171, snapped into place, and to receive and hold the splices. As can be seen in FIG. 14, each splice holding channel 236 and 237 has a resilient wall along only one side thereof, and a rigid wall along the other side. A two resilient wall gripping arrangement as shown in the aforementioned Jones patent would require the pass through channels to be made of resilient material which would have to be longitudinally split to receive the pass through fiber. When, for example, two fairly bulky splices of different configurations are to be held in adjacent splice holding channels, the material for the pass through channel would be both compressed and bent along its length, making the satisfactory splitting thereof virtually impossible. In addition, for such an arrangement, the foam walls would have to be of considerable thickness, which would make it difficult to contain twelve splices from front to back of the holder. With the arrangement shown in FIG. 14, however, no such problems arise.

Figure 18:
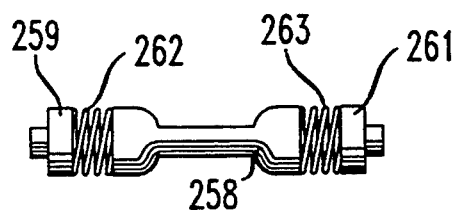
FIG. 18 is a diagrammatic depiction of a typical rotary mechanical splice.
Figure 19:
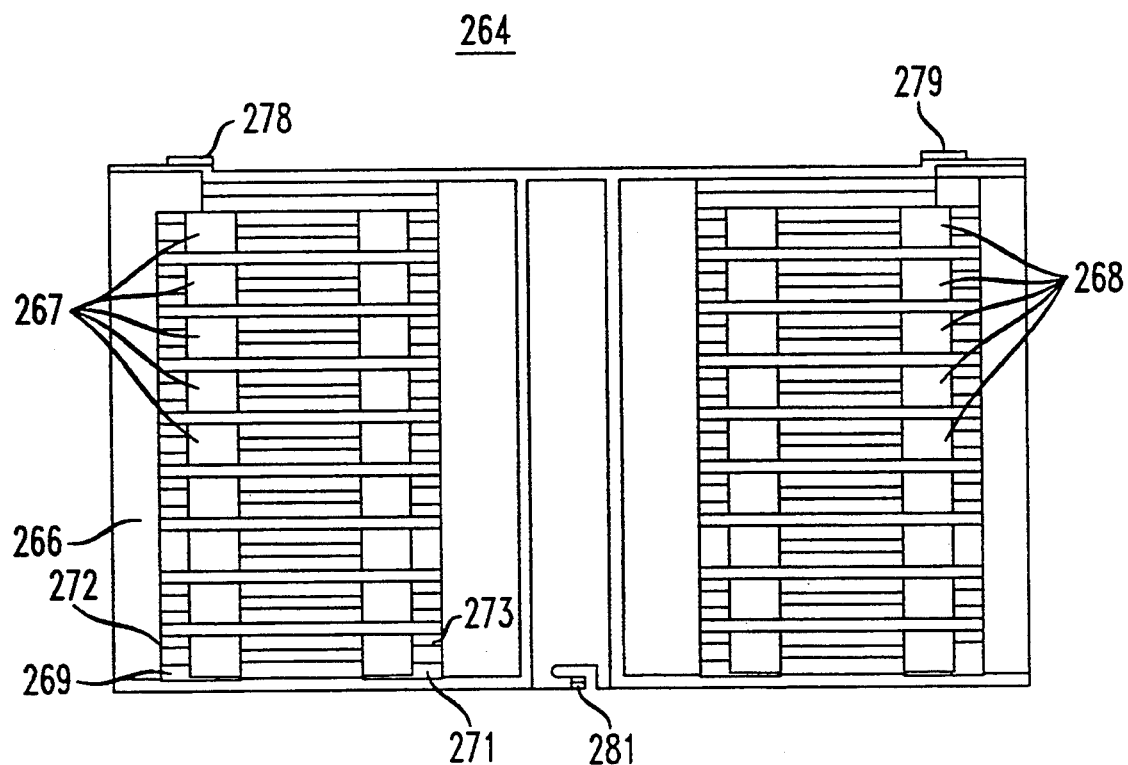
FIG. 19 is a plan view of a splice holder for the splice of FIG. 18.
Figure 20:
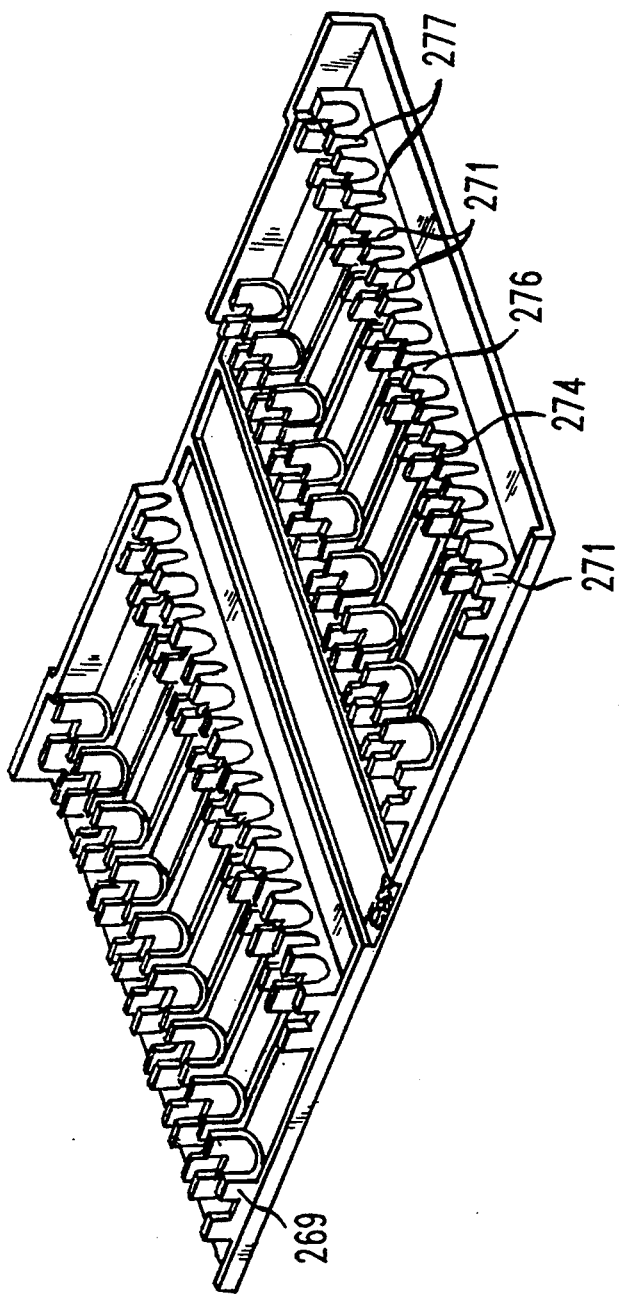
FIG. 20 is a perspective view of the splice holder of FIG. 19.

As discussed in the foregoing, the splice holder of the invention, as shown in FIGS. 14 through 17, is capable of holding twenty-four splices of the more commonly used splices, listed hereinbefore. Only the AT&T Rotary Mechanical splice, shown diagrammatically in FIG. 18, and he GTE Mechanical splice do not fit well in the holder of FIGS. 14 through 17. As a consequence, a single splice holder capable of accommodating either or both of these two splices and which fits readily into base 171 of the splice tray is necessary. A preferred form of such a splice holder is shown in FIGS. 19 and 20. In FIG. 18, it can be seen that the splice is encapsulated in a container 258 having slidable end caps 259 and 261 which are spring biased by coil springs 262 and 263. Such an arrangement is considerably larger in cross-section than the commercially available splices and splice housings which can be used in the holder 173 of FIG. 14, and makes it impossible to array twelve such splice housings across the width of the region 223. In FIG. 19 there is shown a splice holder 214 which comprises a single molded body 266 having the same exterior dimensions as member 241 of FIG. 15. Body 266 has formed therein a plurality of receptacles 267, 267 and 268, 268 forming splice channels for receiving the splice housing 258. Each receptacle is formed by U-shaped end members 269 and 271, each of which has a step 272 and 273 on the inner surface thereof against which the spring biased caps 259 and 261 bear. Thus, when the splice housing 258 is inserted in the receptacle, springs 262 and 263 force caps 259 and 261 firmly against steps 272 and 273, thereby firmly holding the housing in place. As can be seen in FIG. 20, each end members 269 and 271 is formed with upstanding walls 274 and 276 which are separated from the upstanding walls of the adjacent receptacle, thereby forming pass through channels 277, 277. Body 266 has tabs 278 and 279 and a latch member 281 which function, as explained in connection with FIG. 15, to hold member 264 in place within the splice tray.

As best seen in FIG. 13, cap or lid member 172 has formed on the inner surface thereof a plurality of spaced, longitudinally extending ribs 282, 282. The spacing of the ribs 282, 282 is such that when the lid 172 is in the closed position, the ribs overly the pass through channels 238 and 239, thereby insuring that the fibers in the channels cannot slip out. For the splice holder of FIG. 14, the spacing of the ribs 282, 282 is the same as the spacing of the pass-through channels 238 and 239, but the spacing of the pass-through channels 277, 277 in the holder of FIG. 19 is different, hence ribs 282, 282 overly only some of those channels. In addition, some of the ribs overly and bear against resilient member 254, 254. The splice tray is the subject of U.S. patent application Ser. No. 08/263,705, filed Jun. 22, 1994, concurrently herewith in the names of Denis E. Burek, Marc D. Jones and Wesley W. Jones.

The foregoing description and the accompanying drawings have been for purposes of illustrating, in a preferred embodiment, the principles and features of the present invention. The splice closure of the present invention, and the numerous novel components thereof is capable of handling a wide range of cable sizes and configurations without the necessity of customizing any of the structure or components. Numerous changes or modifications may occur to workers in the art, either to the splice closure itself or to one or more of the components thereof, without departure from the spirit and scope of the invention.

We claim:

1. An optical fiber cable splice closure comprising:
   a housing having a base portion and a cover portion defining an enclosure having a longitudinal axis and having first and second open ends for cable ingress and egress;
   gripping means mounted at at least said first end for gripping a cable passing through said first open end, said gripping means including pivoting means for automatically adjusting the gripping action of said gripping means to accommodate cables of different sizes;
   support means mounted on said base portion within said enclosure;
   at least one splice tray mounted on said support means and having a longitudinal axis parallel to the longitudinal axis of said enclosure for holding optically spliced portions of optical fibers contained within the cables;
   at least one splice holding member adapted to be mounted to said tray and having a plurality of parallel, spaced splice holding channels, each of said channels extending parallel to the longitudinal axis of said tray; and
   means for organizing, separating, and directing individual fibers from said cable to said splice tray.

2. A splice closure as claimed in claim 1 and further including gasket means adapted to be placed between said base portion and said cover portion, and means for fastening said cover portion to said base portion.

3. A splice closure as claimed in claim 2 wherein said first and second open ends can hold at least two cables, and further including grommet receiving means affixed to said gasket means having openings through which the cables pass into said enclosure.

4. A splice closure as claimed in claim 3 and further including means for plugging the openings in said grommet receiving means which do not have a cable passing therethrough.

5. A splice closure as claimed in claim 3 and further comprising clamp means for covering and sealing said gripping means and said grommet receiving means.

6. A splice closure as claimed in claim 5 wherein said grommet receiving means is integral with said gasket means and comprises a flexible compressible material.

7. A splice closure as claimed in claim 6 wherein said flexible compressible material is a urethane material.

8. A splice closure as claimed in claim 6 and further comprising first and second grommet members adapted to fit around and contain the cable, said grommet members being further adapted to fit within the openings in said grommet receiving means.

9. A splice closure as claimed in claim 1 wherein said gripping means comprises:

a base member and a separate cap member;

said base member having a groove therein for receiving a cable parallel to the longitudinal axis of said enclosure;

first and second lever arms pivotally mounted to said base member on axes parallel to said groove; and means on said cap member for causing said lever arms to move into engagement with a cable in said groove.

10. A splice closure as claimed in claim 9 wherein said cap member has a gripping groove therein substantially parallel to said groove in said base member.

11. A splice closure as claimed in claim 10 wherein each of said lever arms has a contoured end for engaging a cable in said groove and forcing it into said gripping groove when said lever arms are pivoted.

12. A splice closure as claimed in claim 9 and further including means on said cap member for securing a cable grounding strap thereto.

* * * * *